United States Patent [19]

Longnecker

[11] 4,239,128
[45] Dec. 16, 1980

[54] PRODUCT DISPENSING MEASURING DEVICE

[76] Inventor: Russell D. Longnecker, P.O. Box 731, Mt. Vernon, Wash. 98273

[21] Appl. No.: 31,842

[22] Filed: Apr. 20, 1979

[51] Int. Cl.³ .................................... B67D 5/24
[52] U.S. Cl. ........................... 222/1; 222/30; 222/410; 222/626; 310/91; 310/168
[58] Field of Search ......... 222/1, 23, 30, 36, 410–414, 222/608, 626–628, 135, 138, 139; 221/2, 4, 7, 8, 18 S; 239/675, 677; 310/155, 168, 89, 91; 111/25, 34–36

[56] References Cited

U.S. PATENT DOCUMENTS

| | | | |
|---|---|---|---|
| 2,099,369 | 11/1937 | Lutz | 239/675 |
| 2,547,867 | 4/1951 | Judson | 222/139 |
| 3,099,366 | 7/1963 | Reilly | 222/30 |
| 3,137,073 | 6/1964 | Rawlinson | 235/95 R |
| 3,422,776 | 1/1969 | Gregory | 235/95 R |
| 3,511,411 | 5/1970 | Weiss | 222/626 |
| 3,598,309 | 8/1971 | Engder et al. | 235/96 |
| 3,619,680 | 11/1971 | Okamoto | 310/168 |
| 3,659,747 | 5/1972 | Teichgraeber | 222/626 |
| 3,779,456 | 12/1973 | Burnett | 235/95 C |

*Primary Examiner*—H. Grant Skaggs
*Attorney, Agent, or Firm*—Hughes, Barnard & Cassidy

[57] ABSTRACT

A product dispensing measuring device especially adapted to be affixed to an axially deformed or non-linearly rotating dispensing shaft in order to measure the rate of rotation thereof. The device comprises a pick-up wheel having a plurality of radially outwardly projecting teeth securely affixed to a rotating shaft and a mounting affixed to the shaft adjacent the pick-up wheel and provided with a plurality of roller bearings which enable the mounting to remain stationary as the shaft rotates therein. A mounting arm extends radially from the outer circumferential edge surface of the mounting, and a sensor mechanism is affixed thereto. The sensor mechanism detects the passing of the radially outwardly projecting teeth and converts these impulses into a shaft revolution speed and displays it to an operator of the device. If the shaft rotational speed is observed to be other than that desired, the speed of the rotating shaft may be easily and quickly adjusted.

18 Claims, 4 Drawing Figures

PRODUCT DISPENSING MEASURING DEVICE

BACKGROUND OF THE INVENTION

1. Field of the Invention

The present invention relates to an apparatus and method for dispensing products, such as agricultural products, over a field.

2. Description of the Prior Art

When dispensing agricultural products (lime, fertilizer, etc.), it has heretofore been difficult if not impossible to attain a very high degree of uniformity in applying these products to a broad area. Typically, agricultural products are applied in large quantities using a spreading apparatus having one or more holding bins with an auger shaft running horizontally in the bottom of the holding bin to dispense the product through one or more exit ports. A tractor generally is used to pull the dispensing device, and the motive force for rotating the auger shaft which causes the product to be dispensed is provided by a hydraulic system having a fluid reservoir connected to a hydraulic motor by hydraulic lines. The problem has arisen in that while the linear rate of travel of the tractor pulling the spreading apparatus may be constant, the speed of the hydraulic motor, and therefore the speed at which the auger shaft is driven, varies considerably from time to time during the application of a single product over a particular field. The speed with which the hydraulic motor drives the auger shaft varies due to changes in viscosity in the hydraulic fluid. The speed of the motor, and therefore the shaft, typically increases with longer periods of operation, since as the hydraulic fluid warms up the motor will increase its output accordingly. With changes in the temperature of the hydraulic fluid, the motor's output and the shaft's rotational speed will vary accordingly. This results in an uneven distribution of the product applied, which may often result in reduced crop yields, as well as waste of the product and therefore increased costs.

A search of the U.S. patent literature disclosed a number of devices for dispensing agricultural products. For example, a mechanism to permit a tractor driver to monitor the application of seeds and count the number of seeds dispensed is disclosed in U.S. Pat. No. 3,422,776, Gregory, Jr. The device also indicates the distance traversed by the planter mechanism so that the operator may correlate the number of seeds dispensed with the distance traversed in order to determine whether or not a proper rate of feed is being obtained. An odometer which permits a tractor operator to measure the acreage planted as it is being planted is shown in U.S. Pat. No. 3,137,073, Rawlinson, so that the farmer may measure the amount of acreage planted in order to conform to crop-acreage control laws of particular crops. This apparatus shows a conventional odometer is mounted on the frame of a planter with a lever arm adapted to be rotated by a finger mounted on the end of the planter axle. U.S. Pat. No. 2,099,369, Lutz, shows an auger shaft disposed within a holding bin such that lime is dispensed therefrom.

With regard to various devices which measure rotation of a shaft or other objects, a number of patents were noted. U.S. Pat. No. 3,779,456, Burnett, shows an attachment for a motor vehicle wheel which clamps to the rotating hub of the wheel. There is a shaft which rotates with the vehicle wheel and about which a weighted counter body depends to count and record the revolutions of the shaft. U.S. Pat. No. 3,598,309, Ingler, shows a "driveless" odometer adapted to be mounted on the hubcap of a vehicle wheel. There is a signalling device adapted to be operated upon completion of a predetermined number of revolutions of the rotating member in order to attract the attention of the vehicle operator to perform a particular function, such as to change the motor oil after a particular number of revolutions.

To the best knowledge of the applicant, all of the devices shown in the above patents have various shortcomings in providing a truly satisfactory system for uniformly spreading an agricultural product.

One possible approach which the applicant considered in arriving at the present invention was to monitor the rate of application of the product by relating this to the rotational speed of the auger shaft, and then monitor the speed of the auger shaft relative to the rate of travel of the dispensing vehicle. However, attempts to accomplish this were initially frustrated due to the fact that the auger shaft does not rotate perfectly about a linear longitudinal axis, either because the bushings and bearings used to mount such shafts in agricultural implements fail to maintain even a true shaft rotating about a linear axis, and conventional devices such as odometers, would not properly measure the rate of rotation. This problem was eventually solved in providing the system of the present invention.

It is an object of the present invention to provide an apparatus and method which enables the uniform dispensing of a product, such as an agricultural product, over a field.

SUMMARY OF THE INVENTION

In the present invention, there is a pick-up wheel fixedly mounted to a shaft, the pick-up wheel having a plurality of equally spaced radially outwardly projecting teeth on the circumference thereof. There is also provided a cylindrical mounting means rotatably attached at a location adjacent the pick-up wheel, the mounting means being provided with a plurality of bearing members to permit the shaft to rotate therein. The cylindrical mounting means is provided with a mounting arm extending radially outwardly from the circumferential surface, and adapted to depend vertically below the mounting means. Fixedly attached to the mounting means is a pick-up counting means which is positioned vertically below the pick-up wheel. The pick-up counting means is adapted to count and record each of the radially outwardly projecting teeth of the pick-up wheel as the pick-up wheel rotates with the shaft. A readout display unit is operatively connected to the pick-up counting means and adapted to visually display the rate of rotation of the pick-up wheel and the shaft.

In one environment of the present invention, the pick-up wheel and cylindrical mounting means are attached to an axially deformed auger shaft which dispenses fertilizer or other agricultural products. As the axially deformed auger shaft rotates within the cylindrical mounting means, the pick-up counting means remains adjacent the pick-up wheel and accurately monitors the rate of rotation of the axially deformed auger shaft.

Other features of the invention will become apparent from the following detailed description.

DESCRIPTION OF THE PREFERRED EMBODIMENT

Figure 1:
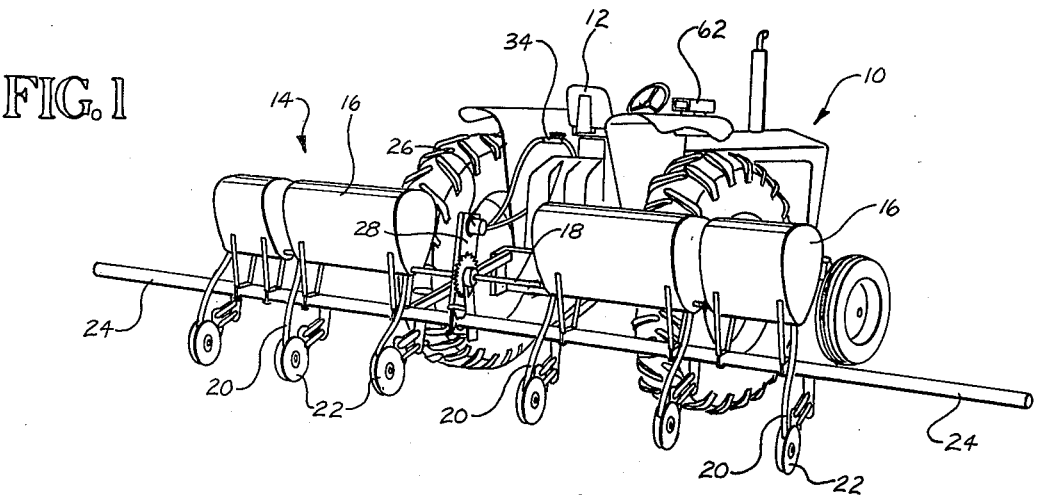
FIG. 1 is an isometric view illustrating one environment of the present invention in place upon the auger shaft of a tractor-mounted fertilizer spreading apparatus.

As shown in FIG. 1, there is a conventional tractor 10 equipped with an operator's seat 12. An agricultural dispensing device 14 is affixed to the rear end of the tractor and adapted to be pulled through a field in order to apply lime, fertilizer, or other agricultural products. The dispensing device 14 comprises a plurality of holding tanks 16 which contain the product to be dispensed, and an auger shaft 18 running horizontally within the length of the holding tank 16. The auger shaft 18 is equipped with a continuous auger blade (of conventional design and not shown herein) which directs the material within the holding tank 16 to one or more exit ports. One method of application, as shown in FIG. 1, is to connect elongate tubes 20 to the exit ports in order to direct the product to be dispensed to the field by way of fertilizer disc openers 22 which track through the rows in the field. There is a horizontal elongate mounting member 24 which extends transverse to the direction of travel and upon which the holding tanks 16 and the present invention are mounted.

Figure 2:
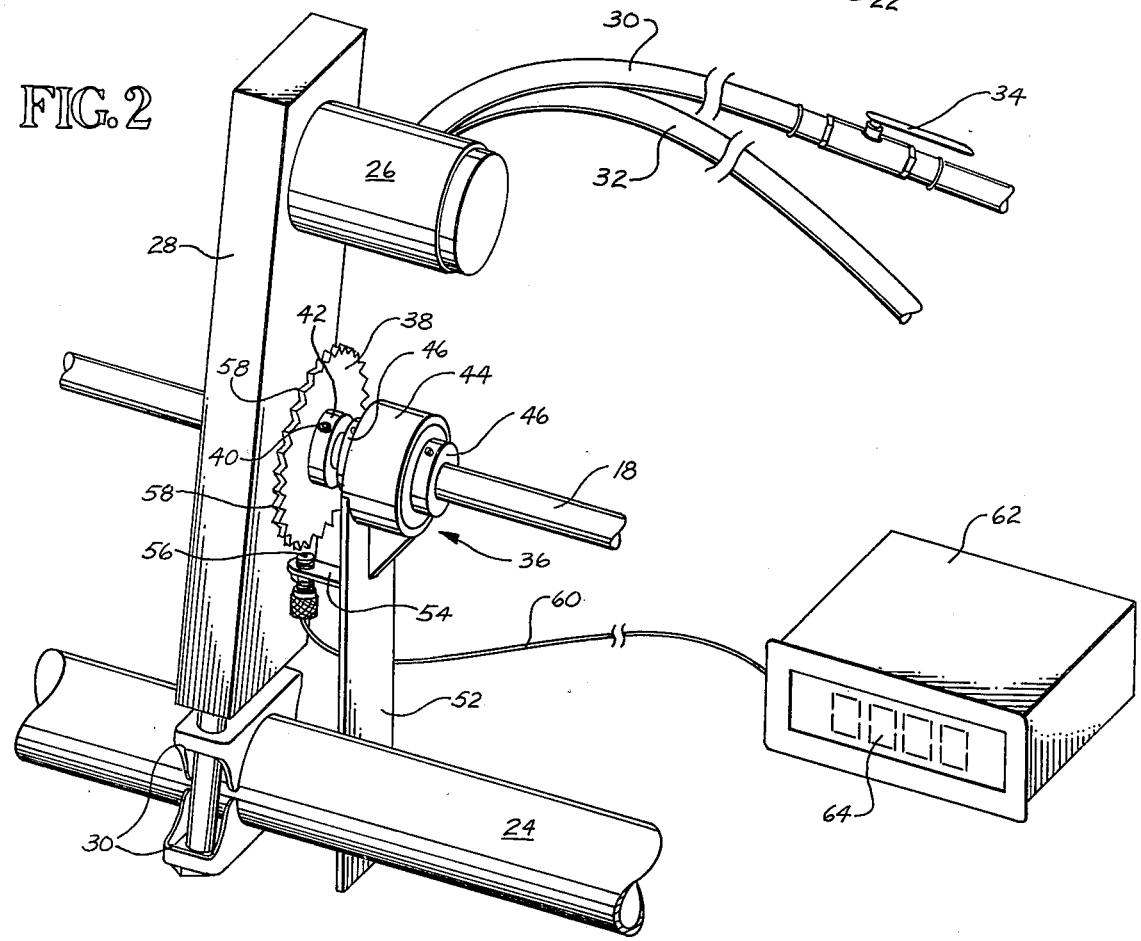
FIG. 2 is an isometric view illustrating the present invention on a rotating shaft.

As may be seen more clearly in FIG. 2, there is a hydraulic motor 26 mounted to a vertically disposed housing member 28 which is operatively connected to the auger shaft 18 through a suitable drive transmission. The housing member 28 is securely affixed, such as by a pair of "C" clamps 30 to the mounting member 24. The hydraulic motor 26 is connected to a hydraulic fluid reservoir (not shown) by means of inlet and outlet hydraulic lines 30 and 32 respectively. The hydraulic line 30 bringing hydraulic fluid to the motor 26 is equipped with a control valve 34 which may regulate the amount of fluid flowing to the motor 26, thereby regulating the speed of the motor 26, and the auger shaft 18. It is to be understood that the present invention could be used in conjunction with any motor used in the present environment, such as an electric motor.

Typically, auger shaft 18 which are utilized in an agricultural environment are not perfectly straight having to a greater or lesser degree a certain amount of axial deformity along all or part of their length or, if straight, are permitted to rotate about a non-linear longitudinal axis due to imprecise bushings or bearings which hold the auger shaft in place. In the apparatus of the present invention, there is a counting device, generally designated 36, mounted to the auger shaft 18 in order to count the revolutions of the shaft even though it may be considerably axially deformed. There is a generally circular pick-up wheel 38 securely affixed to the auger shaft 18 at an exposed location. The pick-up wheel 38 is adjustably secured to the auger shaft 18 by means of a set screw 40 which is biased against the auger shaft 18 through a collar member 42. Adjustably secured adjacent the pick-up wheel 38 is a rotatable mounting means 44 which is secured in the appropriate location on the auger shaft 18 by clamp means 46. The rotatable mounting means 44 is permitted to freely rotate about the auger shaft 18, but is held in place with respect to possible axial movement by the clamp means 46.

Figure 4:
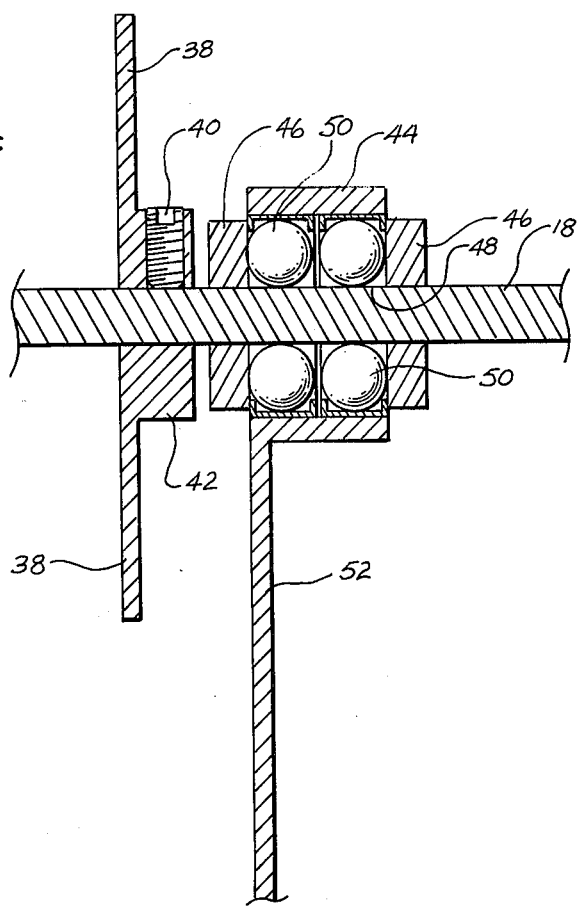
FIG. 4 is a sectional view taken along the line 4—4 of FIG. 3.

As seen more clearly in FIG. 4, the rotatable mounting means 44 is provided with a plurality of roller bearings 50 which enable the mounting means 44 to remain stationary as the auger shaft 18 rotates therein.

Extending radially from the outer circumferential edge surface of the mounting means 44 is a mounting arm 52 which is of sufficient length to hang vertically beneath the auger shaft 18 at least as far as the mounting member 24. Secured horizontally to the mounting arm 52 is a flange 54, being positioned moderately below the outer circumferential edge surface of the pick-up wheel 38. Mounted on the flange 54 is a sensor mechanism 56 which is adapted to detect the passing of the radially outwardly projecting teeth 58 provided on the radially outer circumferential surface of the pick-up wheel 38. The sensor mechanism 56 may be provided in any conventional manner, such as a unit which emits a small radio frequency field from the sensing head, which is absorbed by the metal teeth 58 of the pick-up wheel 38, thereby inducing a signal in the sensor mechanism. Alternatively, the sensor mechanism 56 may provide a simple magnetic field which is affected by the teeth 58 of the pick-up wheel 38 as the wheel rotates. In either case, the electrical impulse generated by the teeth 58 rotating with the auger shaft 18 is conducted from the sensor mechanism 56 through a wire 60 to a digital readout indicator 62 which is capable of converting the teeth-generated impulses into a speed (such as an auger shaft revolution speed in r.p.m.) and displaying it on a screen 64.

Figure 3:
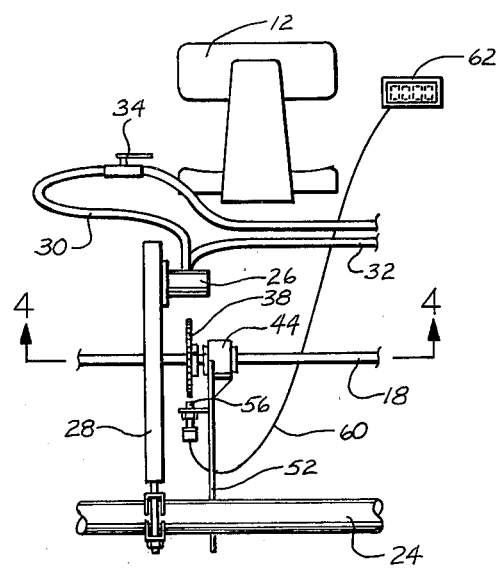
FIG. 3 is a schematic isometric view of the present invention in place upon a tractor.

The operation of the present invention may be seen in FIG. 3. As the auger shaft 18 and the pick-up wheel 38 rotate at a particular speed, electrical impulses are generated in the sensor mechanism 56 and conducted to the digital indicator 62 through wire 60. The tractor operator sitting in the seat 12 may observe the rate of revolution of the auger shaft 18 on the screen 64 of the digital indicator 62. Knowing a predetermined rate at which the operator wishes the materials to be dispensed, if the rate of revolution shown on the screen 64 varies from that desired, the operator may adjust the hydraulic fluid operating the motor 26 by adjusting valve means 34. Therefore, if the rate of revolution observed on screen 64 is too rapid, thereby resulting in an excess of product being dispensed onto the field, the operator may reduce the amount of hydraulic fluid flowing through line 30 to motor 26, thereby slowing down the motor 26 and the rate of revolution of auger shaft 18. If the rate of revolution observed on screen 64 is too slow, the operator may adjust valve 34 to increase the hydraulic fluid flowing to motor 26 thereby increasing the rate of revolution of auger shaft 18.

The significance of the present invention is readily apparent when one considers the previous method of determining the rate at which agricultural products are dispensed from the holding tanks, as well as the potential for error and cost involved when the amount applied is incorrect. Previously, in order to measure the rate of application, one would attach a sack or other suitable container under the tubes 20, start the hydraulic motor and run the auger shaft for one minute. At that point, the amount of product in the container would be weighed and multiplied by a factor determined by the approximate speed which the tractor will travel in the field. In this manner, the approximate number of pounds of product per acre distributed by the auger shaft could be measured for a given row width. The only way in which to monitor the actual rate of application at a later time, in order to determine whether or not the product was being dispensed at or near the same rate, would be to repeat the process at intervals during the day. As typically happens, the rate at which the hydraulic motor operates varies greatly from time to time during the day, or depending upon the product to be dispensed from the holding tank. Therefore, the hydraulic motor may be turning the auger shaft at a greater or lesser speed then that desired, therefore dispensing either a greater or lesser amount of product on the field, resulting in either wasteful application or insufficient application.

With the present system, the tractor operator is able to instantly and continuously monitor changes in auger shaft revolution speed and adjust the hydraulic motor accordingly to maintain a constant output onto the field. The significance of this is appreciated when it is considered that a typical auger shaft will dispense approximately 7 lbs. per acre of dry fertilizer for every revolution per minute. If it is desired to apply 210 lbs. per acre (an auger speed of 30 rpm), and the auger shaft is rotating at 1 rpm above or below that which is desired, the resulting application will be 3½% above or below that which is desired. It has been found by experience that it is not uncommon for an auger shaft to change its rotational speed as much as 3 or 4 rpm's faster or slower over the course of a day (thereby having a range of variation of plus or minus 6 to 8 rpm's), so that is would be possible to apply almost 25% more or less of an agricultural product than was desired. The ramifications of such an error, both in terms of damage to the field and the expenses incurred, are easily appreciated.

Having thus described the Preferred Embodiment of the Invention it should be understood that numerous structural modifications and adaptations may be resorted to without departing from the spirit of the invention.

What is claimed is:

1. An agricultural product dispensing apparatus especially adapted to dispense a commodity and to continuously monitor the rate at which said commodity is applied, said apparatus comprising:
   a. a structure comprising at least one holding tank containing a quantity of product to be applied over a broad area, and a housing member to which is rotatably mounted an auger and auger shaft for dispensing said product from said tank;
   b. power means adapted to rotate said auger and said auger shaft;
   c. a pick-up member fixedly mounted to said auger shaft so as to be rotatable therewith independent of said housing member, and having at least one pick-up element thereon, which pick-up element follows a rotational path with rotation of said auger shaft,
   d. mounting means rotatably attached to said auger shaft proximate said pick-up member in a manner to be supported directly by said auger shaft independent of said housing member in a manner to maintain a substantially constant position relative to said shaft as said shaft rotates and shifts radially relative to said housing member,
   e. pick-up counting means supported from said mounting means so as to be positioned adjacent the rotational path of the pick-up element and adapted to measure the number of revolutions of said pick-up element as said pick-up member rotates with said auger shaft, and passes by said pick-up counting means whereby, when said auger shaft is operated in order to dispense agricultural products from said holding tanks, rotation of said auger shaft may be measured by said pick-up counting means as a means of measuring the rate of application of said agricultural product.

2. The apparatus as recited in claim 1, wherein said mounting means comprises a tubular housing member having an aperture therethrough to receive said auger shaft, said mounting means being further provided with a plurality of bearing members arranged around an inner circumferential portion of said mounting means.

3. The apparatus as recited in claim 1, wherein there are at least two holding tanks, and said mounting means is affixed to said auger shaft adjacent said pick-up member at an exposed location between said holding tanks.

4. The apparatus as recited in claim 1, wherein said mounting means is provided with a depending mounting arm extending radially outwardly from an outer circumferential surface of said mounting means, said depending mounting arm are being adapted to depend vertically below said mounting means.

5. The apparatus as recited in claim 4, wherein said pick-up counting means is fixedly attached to said depending mounting arm so that said pick-up counting means depends vertically below and adjacent to said pick-up member.

6. The apparatus as recited in claim 5, wherein said pick-up member comprises a plurality of outwardly projecting teeth, and said pick-up counting means is arranged to count and record each of said outwardly projecting teeth of said pick-up member as said pick-up member rotates with said auger shaft, such that said pick-up member and said depending mounting arm with said pick-up counting means mounted thereto are adapted to rotate with parallel movements if positioned upon an auger shaft.

7. The apparatus as recited in claim 1, wherein said power means comprises a hydraulic motor and hydraulic lines thereto, at least one of said hydraulic lines having adjustable valve means thereon adapted to regulate the output of said motor.

8. The apparatus as recited in claim 1, further comprising a readout display unit operatively connected to said pick-up counting means adapted to visually display the rate of rotation of said pick-up wheel and said auger shaft, said display unit being further adapted to be mounted to a tractor or other vehicle and visible to a driver thereof.

9. An agricultural product dispensing apparatus especially adapted to dispense a product and to continuously monitor the rate at which said product is applied, said apparatus comprising:
   a. at least two holding tanks containing a quantity of product to be applied over a broad area, said tanks having an auger and auger shaft therein for dispensing said product from said tank, said auger shaft being mounted to a housing component,
   b. power means adapted to rotate said auger and auger shaft, said power means comprising a hydraulic motor and hydraulic lines, c. a pick-up member fixedly mounted to said auger shaft at an exposed position between said holding tanks and having tooth means thereon, said tooth means following a rotational path with rotation of said auger shaft, d. mounting means rotatably mounted to said auger shaft independent of said housing component and comprising a tubular mounting member having an aperture therethrough to receive said auger shaft, said mounting means further comprising a depending mounting arm extending radially outwardly from said mounting member, said depending mounting arm being adapted to depend vertically below said mounting member e. said mounting member being affixed to said auger shaft adjacent said pick-up member, f. pick-up counting means affixed to said mounting arm at a location proximate said rotational path and especially adapted to count and record said tooth means of said pick-up member as said pick-up member rotates with said auger shaft, g. a readout display unit operatively connected to said pick-up counting means and adapted to display rate of rotation of said pick-up member and said auger shaft, whereby when a driver of said vehicle observes the readout display unit to be showing an auger shaft rotation rate different from that desired, the driver may adjust the rate of rotation of said auger shaft by adjusting valve means leading to said hydraulic motor.

10. An apparatus especially adapted to measure the rate of rotation of an apparatus such as an auger to dispense agricultural products, said apparatus comprising, a. a housing structure, b. a shaft rotatably mounted to said housing structure so as to be permitted to rotate about a non-linear longitudinal axis relative to said housing structure, c. a pick up means fixedly mounted to said shaft and having plurality of equally spaced radially outwardly projecting teeth on a circumference thereof, said tooth means following a rotational path as said shaft rotates, d. mounting means rotatably attached to said shaft and directly mounted thereto independent of said housing structure at a location adjacent to said pick-up means so as to maintain a substantially constant position relative to said shaft and said pick-up means as said shaft rotates and, e. pick-up counting means affixed to said mounting means positioned adjacent said rotational path to measure rate of revolution of said pick-up wheel means as said pick-up wheel means rotates with said shaft.

11. The apparatus as recited in claim 10, wherein said mounting means comprises a tubular housing member having an aperture therethrough, said mounting means being further provided with a plurality of bearing members arranged around an inner circumferential portion thereof.

12. The apparatus as recited in claim 11, wherein said bearing means are arranged such that they are arranged in at least two axially spaced sets in contact with said shaft about the circumference of said shaft, so that said shaft is permitted to rotate within said tubular housing member and said mounting means is maintained in proper axial alignment.

13. The apparatus as recited in claim 10, wherein said mounting means is affixed to said shaft adjacent said pick-up wheel at an exposed location.

14. The apparatus as recited in claim 10, wherein said mounting means is provided with a mounting arm extending radially outwardly from an outer circumferential surface of said mounting means, said mounting arm being adapted to depend vertically below said mounting means.

15. The apparatus as recited in claim 14, wherein said pick-up counting means is fixedly attached to said depending mounting arm so that said pick-up counting means is positioned vertically below said pick-up means.

16. The apparatus as recited in claim 15, wherein said pick-up counting means is adapted to count and record each of a plurality of radially outwardly projecting teeth of said pick-up means as said pick-up means rotates with said shaft.

17. The apparatus as recited in claim 10, wherein there is a readout display unit operatively connected to said pick-up counting means and adapted to visually display the rate of rotation of said pick-up wheel and said shaft, said display unit being further adapted to be mounted to a vehicle and visible to a driver thereof.

18. A method for permitting the driver of a farm vehicle to vary the rate at which an agricultural product is dispensed onto a field from a holding tank, said holding tank having a rotating auger shaft therethrough, said auger shaft powered by hydraulic or electric power means and being mounted to a housing structure, said method comprising the steps of:

a. rotatably mounting a mounting member about said auger shaft independent of said housing structure so that said auger shaft rotates relative to said mounting member;

b. fixedly connecting to said auger shaft at a location adjacent said mounting member a pick-up member having tooth means thereon, said tooth means following a rotational path as said shaft rotates, c. mounting a pick-up counting means to said mounting member independent of said housing structure, d. operatively connecting a readout display unit to said pick-up counting means to show the rate of revolution of said auger shaft; and e. adjusting the output of said power means relative to rotation of said auger shaft as indicated in said readout display unit in order to vary the rate of rotation of said auger shaft.

* * * * *

UNITED STATES PATENT AND TRADEMARK OFFICE
CERTIFICATE OF CORRECTION

PATENT NO. : 4,239,128
DATED : December 16, 1980
INVENTOR(S) : Russell D. Longnecker It is certified that error appears in the above-identified patent and that said Letters Patent are hereby corrected as shown below:

In Claim 4, Column 6, line 27 the word "are" should be deleted.

In Claim 10, Column 7, lines 40-42 the following words should be deleted:

"plurality of equally spaced radially outwardly projecting teeth on a circumference thereof, said"

Signed and Sealed this

Sixth Day of October 1981

[SEAL]

Attest:

GERALD J. MOSSINGHOFF

Attesting Officer

Commissioner of Patents and Trademarks